United States Patent [19]

Vydra et al.

[11] Patent Number: 5,187,021
[45] Date of Patent: Feb. 16, 1993

[54] COATED AND WHISKERED FIBERS FOR USE IN COMPOSITE MATERIALS

[75] Inventors: Jacob Vydra, Worthington, Ohio; Anatoly Altshuler, Lynn, Mass.

[73] Assignee: Diamond Fiber Composites, Inc., Columbus, Ohio

[21] Appl. No.: 307,826

[22] Filed: Feb. 8, 1989

[51] Int. Cl.$^5$ ............................ C22C 1/09; B32B 5/00
[52] U.S. Cl. .................................... 428/607; 428/614; 428/378; 428/380; 428/397; 428/400
[58] Field of Search ............... 428/614, 608, 607, 375, 428/378, 380, 381, 384, 397, 400

[56] References Cited

U.S. PATENT DOCUMENTS

| | | | |
|---|---|---|---|
| 3,252,814 | 5/1966 | Russell et al. | 106/57 |
| 3,580,731 | 5/1971 | Milewski et al. | 117/66 |
| 3,808,087 | 4/1974 | Milewski et al. | 161/72 |
| 4,397,901 | 8/1983 | Warren | 428/375 |
| 4,402,943 | 9/1983 | Aisenberg et al. | 427/38 |
| 4,612,233 | 9/1986 | Kiergursky et al. | 428/380 |
| 4,892,693 | 1/1990 | Perrotta et al. | 164/97 |
| 4,960,654 | 10/1990 | Yoshinaka et al. | 428/614 |

FOREIGN PATENT DOCUMENTS

| | | | |
|---|---|---|---|
| 920033 | 1/1973 | Canada | 156/610 |
| 748077 | 5/1977 | Canada . | |
| 295688 | 11/1987 | European Pat. Off. . | |
| 325797 | 8/1989 | European Pat. Off. | 428/614 |

OTHER PUBLICATIONS

Dergunova et al., "Composites Based on Whiskered Fibers" in Fiber-like Crystals and Thin Films, Proceedings of the IInd All Union Scientific Conference, Voronezh 1975 p. 373.

Gunyayev et al., "Effect of Whiskerization of Carbon Fibers on the Physical and Mechanical Properties of Composites based thereon" in Fiber-like Crystals and Thin Films. Proceedings of the IInd All Union Scientific Conference, Voronezh 1975, p. 379.

Towata and Yumada, "Mechanical Properties of Aluminum Alloy Composites with Hybrid Reinforcements of Continuous Fiber and Whisker or Particulate" in Composites '86: Recent Advances in Japan and the United States p. 497.

Butuzov et al., "Growth of Diamond Whiskers in a Metal-Carbon System at High Temperatures and Pressures" in Sov. Phys. Dokl., vol. 20, No. 11, p. 717.

Primary Examiner—John Zimmerman
Attorney, Agent, or Firm—Watkins, Dunbar & Pollick

[57] ABSTRACT

Diamond and ceramic whiskers 712 are grown on diamond, ceramic, or metal coated 714 fibers 710 (e.g. carbon, glass, ceramic or metal fibers) and used in composites 700. The whiskers 712 1) increase fiber-matrix bonding, 2) maintain fiber separation and 3) provide uniform fiber distribution. The coating 714 1) improves the mechanical properties of the fiber and 2) protects the fiber 710 from corrosive attack by the matrix material 720. A catalytic process for growing whiskers 712 allows fiber strength to be maintained during the whisker growth process. Composite materials made with whiskered or coated and whiskered fibers are useful whenever light-weight and high strength materials are required.

25 Claims, 4 Drawing Sheets

COATED AND WHISKERED FIBERS FOR USE IN COMPOSITE MATERIALS

FIELD

This invention relates to coated and whiskered fibers. More particularly, this invention relates to fibers that have protective coatings and whiskers and are designed for use in composite materials.

BACKGROUND OF THE INVENTION

Interactions between the fibers and matrix of continuous fiber reinforced composite materials that occur during manufacture and in use determine the mechanical properties, fracture behavior, and service characteristics of these materials. The inherent fiber-matrix compatibility and the composite manufacturing process must result in a strong bond between the fibers and the matrix and, at the same time, minimize the dissolution of the fiber in the matrix and reaction diffusion between the matrix and the fiber materials. The lack of a strong bond between the fibers and the matrix, the dissolution of the fibers in the matrix, and reaction diffusion at the fiber-matrix interface cause bond breaking, delamination, internal stress, fracture, and other types of failures.

Conventional solutions to these problems include 1) the surface treatment of fibers with barrier coatings to preserve the fiber and the interface boundary strength, 2) the development of various combinations of compatible matrix and fiber materials, and 3) the addition of particulate additives to more evenly distribute fibers in the matrix throughout the composite and to serve as an interlocking mechanism between the fibers and matrix.

In the area of surface treated fibers, U.S. Pat. No. 4,097,624, June 27, 1978 to Schladitz describes a method of coating glass or carbon fibers with 3 $\mu$m-thick Ni layer to minimize the fiber-matrix interaction. Similarly, the coating of carbon fibers with Mo or Cr layers followed by application of a SiC barrier coating is described in "Composite Materials," Baikov Institute for Metallurgy, USSR Academy of Sciences, Moscow, Nauka Publishing House, 1981, p. 71 and in D. Clark, N. J. Wadsworth, and W. Watt; "The Surface Treatment of Carbon Fibers for Increasing the Interlaminar Shear Strength of CFRP" in Carbon Fibers; Place Mod. Techno. London, 1974, p. 44-51.

Unfortunately barrier coatings using prior art methods and materials do not result in the simultaneous achievement of good adhesion between the fiber and the matrix and the prevention of interaction-diffusion at the interface. Carbide, nitride, or oxide barrier layers with high-temperature chemical stability hinder the formation of strong physico-chemical bonds between the matrix and the fiber resulting in separation of fibers from the matrix and the conglomeration of individual fibers. As a result, cracks tend to develop at the point of fiber to fiber contact.

A second method to achieve stronger composite materials is by enhancing the fiber-matrix bond through the improvement of the wettability of the fibers. This is achieved by coating the fibers or doping the matrix material. For example, carbon fibers are coated with less than a 1 $\mu$m thick nickel layer to improve their wettability by an aluminum melt; aluminum is doped with up to 7% silicon and 0.6% magnesium to alter the adhesion mechanism at the fiber-matrix interface. "Cast Reinforced Metal Composites," Conference Proceedings, ASM International, 1988 p. 67. Although this approach enhances the physicochemical bonding between the fibers and matrix, it, unfortunately, causes dissolution of the fibers and the formation of intermediate phases and compounds that lessen the mechanical strength of the composite.

A third approach to obtaining stronger composite materials has been to use particulates that separate the fibers and interlock fibers and matrix. S. Towata and S. Yamada, "Composites 86: Recent Advances in Japan and the Untied States," Ed. Proc. Japan-U.S. CCM-III Tokyo, 1986, pp. 497–503, describe an aluminum alloy reinforced with continuous carbon or silicon carbide fibers in which silicon carbide whiskers or other fine particles are distributed among the continuous fibers. Soviet researchers have grown SiC whiskers directly on the bare surface of carbon fibers and then have incorporated the fibers into polymer-matrix composites. "Composite Materials based on Whiskered Fibers" and published in "Fiber-like Crystals and Thin Films", Proceedings of the IInd All-Union Scientific Conference, Voronezh 1975, p. 373. In both of these cases, the shear strength of the composite material increased; however, because there is an absence of a barrier coating on the continuous fibers, disintegration of the fibers caused either by a chemical reaction between the fibers and the matrix material or by the whiskering process or both takes place resulting in a significant loss of composite material strength. When carbon fibers were whiskered at 3 wt. % to obtain optimal composite shear strength, the carbon-fiber strength decreased by a factor of two.

SUMMARY OF THE INVENTION

The above-described problems associated with fiber reinforced composites are solved by the present invention of a catalytically prepared whiskered fiber or a coated and whiskered fiber. The core fiber may be any suitable continuous fiber such as, but not limited to, carbonaceous, ceramic, glass and metal (including metal-alloy) fiber. The fiber coating (film) is made from any suitable material such as, but not limited to, metal (including metal-alloy), ceramic, diamond and diamond-like materials. The coating is applied to the fiber prior to whisker growth or, alternatively, to both the fiber and whiskers after the whiskers have been grown on the fiber. The whiskers are intimately attached to the fiber or, alternatively, are intimately attached to the coating of a coated fiber after a suitable coating film has been applied. The whiskers are distributed randomly over the radial surface of the fiber and project outwardly therefrom. The whiskers are grown from any suitable material such as diamond or ceramic materials, e.g., silicon nitride, silicon carbide, titanium carbide, or titanium oxide.

The projecting whiskers on a fiber offer the following advantages over a conventional composite fiber:

a) they strongly bind fibers with the matrix due to the micromechanical interaction through the whiskers thereby preventing delamination of the composite material and greatly increasing the composite shear strength; the mechanical properties of diamond and ceramic whiskers are the highest among known materials;

b) they maintain a separation of the fibers from each other thereby preventing their conglomeration and formation of nonimpregnated groups of filaments or the initiation of local stress sites; and c) they provide a favorable fiber distribution in the matrix and a resulting decrease in thermally and mechanically induced internal stresses.

A coating applied to the fiber either prior to or after the whiskering process provides the following additional advantages:

a) it improves the mechanical properties of the fibers by healing surface defects and perfecting the surface structure; and b) it ensures substantial protection of the fibers from the matrix material.

A coating applied prior to the whiskering process serves to further protect the fiber from the heat and chemical environment of the whiskering process and thereby serves to maintain the strength of the fiber.

By using diamond coatings and whiskers on reinforcing continuous fibers, the theoretical limits of strength and heat resistance of composite materials become attainable. The strength of metal matrix composites, for example, can be increased by a factor of 1.5–2, reaching, in some cases, 3,700–4,000 MPa. Diffusion processes through a diamond coating are minimal up to about 1300° C.; volume graphitization of diamond under atmospheric pressure does not begin until 1500° C.

Providing the fiber with a protective coating improves the service characteristics of the composite material by protecting the fiber from the matrix material. Although a protective coating can be applied after the whiskers are grown on the fiber, in many instances it is desirable to apply such a protective coating prior to the whisker growth process. For example, an initial protective coating is desirable to protect the fiber from the harsh environment and temperatures of the whiskering process. Also an initial fiber coating can improve the mechanical properties of the fiber by healing surface defects and perfecting the surface structure prior to the whiskering process.

A protective metal, ceramic, diamond or diamond-like film or coating is formed on the fibers by using conventional in vacuo wetting processes as well as electrochemical and vacuum spraying techniques. For example, silicon carbide and titanium carbide coatings are formed on polyacrylonitrile (PAN) based carbon fibers by in-vacuo wetting of the fiber in metal melts of aluminum, silicon and copper or aluminum, titanium and copper followed by annealing of the metal-coated fibers in vacuum or an inert atmosphere. Diamond-coated fibers are made by depositing a diamond film on the fiber using a high energy plasma source that creates ions and electrons and contains a suitable hydrocarbon gas such as methane thereby affording carbon atoms and ions. Carbon atoms and ions can also be obtained from carbon electrodes that are electrically heated so as to sputter carbon ions uniformly about and against the fiber surface. Alternatively the fibers can be coated with a diamond-like coating by first depositing amorphous carbon film on the surface of the fiber using a low-energy hydrocarbon containing ion beam and then transforming the amorphous carbon into diamond-like carbon by exposing the amorphous carbon surface to a high-energy ion beam that simultaneously converts the amorphous carbon to diamond-like carbon while removing lesser bound carbon atoms from the deposited film.

Cleaning of the surface of the core fiber prior to deposition of the coating material enhances the bond between the fiber and the coating material. For example, a barrage of high energy or energetic plasma created ions and electrons against a fiber removes surface contaminants and diminishes microscopic surface defects. The freshly exposed, i.e., ion milled surface enhances deposition of a coating material by increasing the strength of the bond between the fiber surface and the coating.

A whiskered fiber increases matrix fiber binding as a result of whisker interaction while at the same time maintaining fiber separation and improving fiber distribution in the matrix. Whiskers are grown on either a bare or coated fiber by first applying a uniform dispersion of "whisker growth" particles to the fiber surface and then drying the fiber to remove any solvent. The whisker growth particles serve as a site for initiating and promoting whisker growth. Typically the whisker growth particles are rare earth or transition metals or transition metal compounds such as lanthanum or iron or compounds such as iron trichloride, iron pentacarbonyl or nickel tetracarbonyl that decompose to give finely divided nascent metal particles. The particle treated fiber is then fed into a vacuum chamber containing a hot gaseous mixture of whisker forming material. As the hot gaseous mixture strikes the relatively cool fiber, an extreme super saturation of the mixture takes place at the particle nucleation site with subsequent whisker growth via a vapor-liquid-solid mechanism at a rate of several microns per minute.

The presence of a volatile transition metal compound such as ferrocene Fe(C$_5$H$_5$)$_2$, iron pentacarbonyl Fe(CO)$_5$, nickel tetracarbonyl Ni(CO)$_4$ or dicobolt octacarbonyl Co$_2$(CO)$_8$ also acts as a catalyst to significantly reduce the temperature at which the reactant substances (materials) combine to give the whisker forming material. For example, the formation of silicon carbide takes place at temperatures above 1500° C. However, by using a catalyst, the temperature can be lowered to about 1000° C. and preferably to approximately 900° C. thereby eliminating the fiber weakening effects caused by higher temperatures. As a result of the lower temperatures afforded through the use of a catalyst, it is possible to grow whiskers directly on a fiber without loss of the fiber strength previously encountered.

For example, to prepare silicon carbide (SiC) whiskers, the reaction of the substances silicon tetrachloride and methane in the presence of hydrogen and with a ferrocene catalyst occurs to produce silicon carbide according to the following reaction scheme:

$$SiCl_4 + CH_4 \xrightarrow{H_2} SiC + 4HCl$$

SiC whiskers begin to form and continue to grow at the particle nucleation site previously applied to the fiber.

For the preparation of diamond whiskers, the substance carbon tetrachloride is reacted with the substance methane in the presence of hydrogen with ferrocene as the catalyst according to the following scheme:

$$CCl_4 + CH_4 \xrightarrow{H_2} 2C_{Diamond} + 4HCl$$

To prepare silicon nitride, the substances silicon tetrachloride, nitrogen, and hydrogen are reacted according to the following reaction scheme using ferrocene as the reaction catalyst:

$$3SiCl_4 + 2N_2 + 6H_2 \longrightarrow Si_3N_4 + 12HCl$$

Coated and whiskered fibers are particularly useful as a reinforcing material for composite materials. For example, whiskered or coated and whiskered fibers can be shaped into a preform with the whiskers serving to maintain an even distribution of the fibers in the preform. The preform is then set into a die cavity into which a molten matrix material is poured. The preform and molten matrix material are then squeezed to form a composite reinforced with whiskered fibers or coated and whiskered fibers. In such a process, the matrix material is typically a molten metal such as magnesium or aluminum alloys.

In another method of making composite materials, alternate layers of metal foil, e.g., aluminum foil, and whiskered fibers or coated and whiskered fibers are prepared. These alternate layers of fibers and metal foil are then rolled to form a composite sheet. In the sheet rolling technique, the whiskered or coated and whiskered fibers can be arranged in a criss-crossing fashion to further improve the strength of the resulting composite material.

It is an object of this invention to provide a whiskered fiber or a coated and whiskered fiber that interlocks with other similar fibers in a matrix material to provide a composite material of superior strength and crack and stress resistance. Composite materials reinforced with such whiskered or whiskered and coated fibers are useful as lightweight armor, automobile parts, ship and space vehicle components, and for other purposes requiring light-weight and very high-strength materials.

Other objects and features of the invention will be apparent and understood from the detailed description of the invention and the accompanying drawings which follow. The foregoing and other advantages of the invention will become apparent from the following disclosure in which the preferred embodiment of the invention is described in detail and illustrated in the accompanying drawings. It is contemplated that variations and procedures, structural features and arrangements of materials may appear to the person skilled in the art without departing from the scope or sacrificing any of the advantages of the invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalence which operate in a similar manner to accomplish a similar purpose.

Although a preferred embodiment of the invention has been herein described, it will be understood that various changes and modifications in the illustrated and described structure can be effective without departure from the basic principle that underlay the invention. Changes and modifications of this type are therefore deemed to be circumscribed by the spirit and scope of the invention, except as the same may be necessarily modified by the appended claims or reasonable equivalence thereof.

DETAILED DESCRIPTION OF THE INVENTION AND BEST MODE FOR CARRYING OUT THE PREFERRED EMBODIMENT

Figure 1:
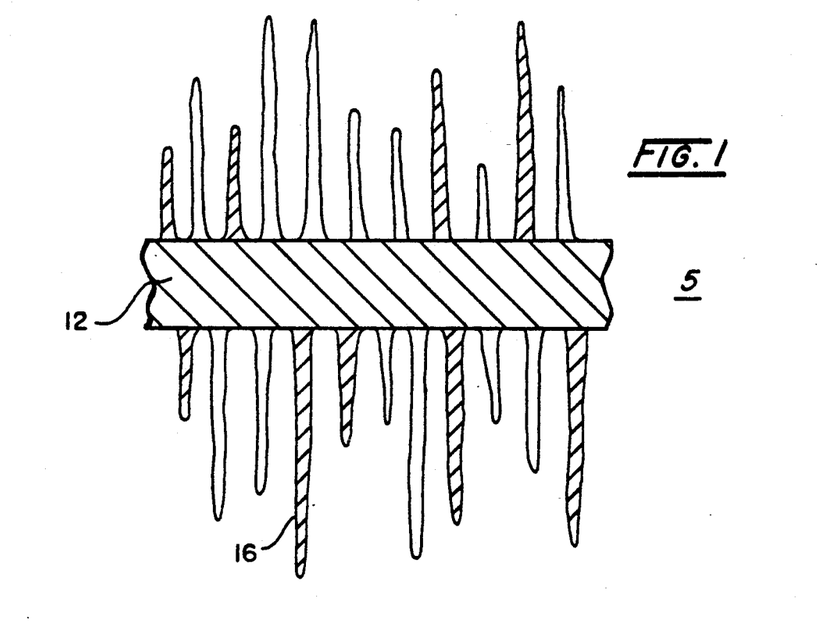
FIG. 1 is a longitudinal cross-sectional view of a whiskered fiber.
Figure 2:
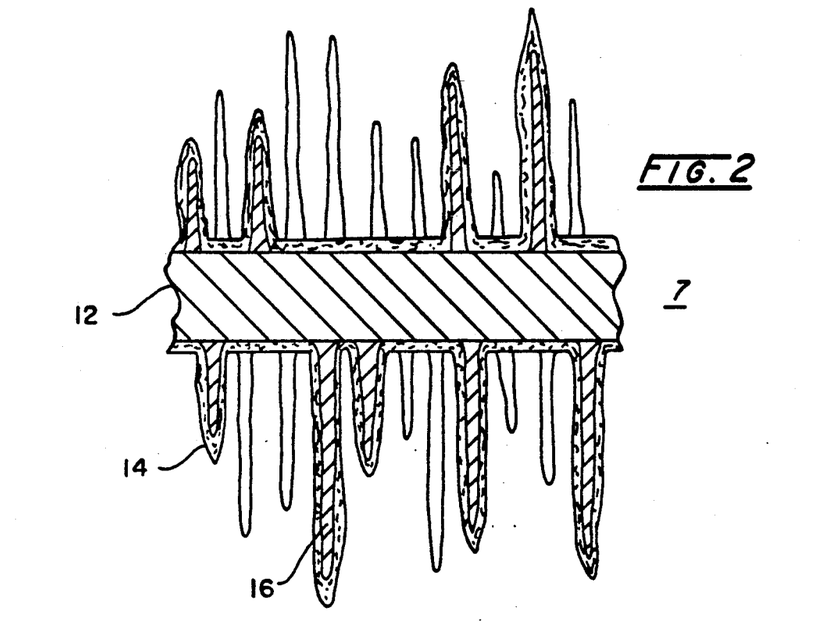
FIG. 2 is a longitudinal cross-sectional view of a whiskered and coated fiber.
Figure 3:
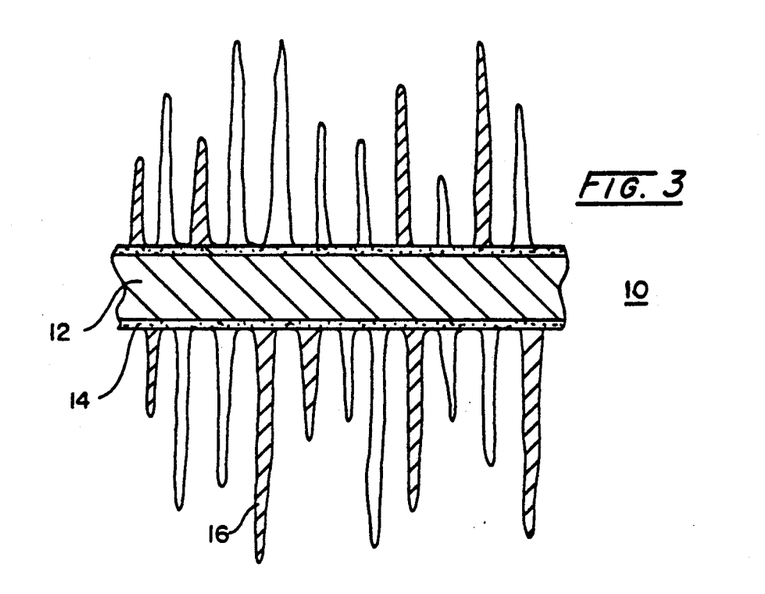
FIG. 3 is a longitudinal cross-sectional view of a coated and whiskered fiber.
Figure 4:
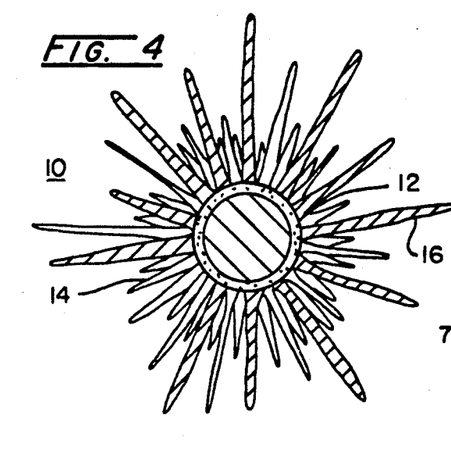
FIG. 4 is a lateral cross-sectional view of a coated and whiskered fiber.

Referring now to the drawings wherein the representations are for the purpose of illustrating the preferred embodiments of the invention only and are not for the purpose of limiting the same, FIGS. 1-4, show a whiskered fiber generally denoted by the number 5 (FIG. 1), a whiskered and then coated fiber denoted by the number 7 (FIG. 2), and a coated and then whiskered fiber denoted by the number 10 (FIGS. 3-4). The fiber, coating material, and whisker material are denoted by the numbers, 12, 14, and 16, respectively. Generally a fiber that is whiskered only 5 is used when fiber/composite matrix material weakening interactions and reactions are negligible but fiber distribution and separation are of importance. A fiber that is first whiskered and then coated 7 is used when weakening interactions and reactions among the composite matrix material, the fiber, and the whisker material are significant. A fiber that is first coated and then whiskered 10 is used when weakening interactions and reactions between the fiber and composite matrix material are of primary consideration while composite matrix material and whisker material interactions and reactions are minimal. Also it may be important to coat the fiber first so as to protect the fiber from the high temperature and chemical environment of the whiskering process.

The core fiber 12 must be of a suitable material of sufficient strength and durability so as to be able to withstand the whiskering or coating and whiskering process. A wide range of such materials are known. For example, carbonaceous fibers include carbon fibers such as PAN fibers prepared from polyacrylonitrile, graphite fibers, and diamond fibers that are prepared by sintering diamond whiskers. Ceramic fibers include a wide variety of carbides, borides, nitrides, and oxides of a wide variety of elements including transition metal elements such as titanium and zirconium, rare earth elements such as hafnium, and main group elements such as silicon and boron. Glass fibers include S-2 type fibers which are high strength aluminum-magnesium-silicon glass fibers. Metal fibers (including metal alloy fibers) are illustrated by tungsten and tungsten-based alloy fibers. As shown in FIGS. 2, 3 and 4, a coating or film 14 completely surrounds and covers fiber 12, i.e., a continuous, uninterrupted coating. This coating or film 14 can be formed from metal (including metal alloys), ceramic, and diamond and diamond-like materials.

The terms diamond-like and diamond are used interchangeably with regard to the properties of the crystalline carbonaceous material coating or film 14 found on fiber 12 (FIGS. 3 and 4) or on the fiber 12 and whiskers 14. The term "diamond-like" conventionally is used to distinguish the structure of the crystalline carbon film on the fiber 12 or whiskers 14 from the structure of non-film diamond crystals. However, it is noted that both diamond-like and diamond crystals are both crystalline materials having the same properties, e.g., (1) a similar index of refraction (2) high electrical resistivity (3) transparency in the visible light range, (4) high dielectric constant, (5) the ability to abrade glass, and (6) high resistivity to hydrofluoric acid etching. For the purposes of this description, the term "diamond" includes the term "diamond-like."

As will be described in more detail later on, the diamond-like coating is applied to the fiber by vaporizing atoms of carbon on the fiber 12 or by sputtering carbon atoms from electrodes onto the surface of the fiber and then transforming the graphite structure of the coating into a diamond structure. Similar techniques can be used to apply ceramic and metal coatings.

The whiskers 16 are single crystal fibers that have mechanical strengths approaching interatomic bonding forces. Typically the whiskers 16 are diamond, silicon nitride, silicon carbide, titanium oxide, or other high strength ceramic-type material. Whiskers 16 are grown on the surface of the fiber 12 or on the coating 14 by depositing particles on the fiber 12 or fiber coating 14 that serve to initiate and support whisker growth. Preferably these particles are atomized metal particles or a compound capable of being readily converted to metal particles, e.g., iron pentacarbonyl. The whiskers are typically grown at the particle (nucleation) sites, which are typically molten atomized metal particles, by a vapor-liquid-solid mechanism in which the gaseous components of the whisker material condense and react on the molten metal particle to form a supersaturated solution from which the solid whisker grows at a rapid rate. For the purposes of this invention, the gaseous components of the whisker material as well as the whisker materials themselves are referred to as whisker forming material.

Figure 5:
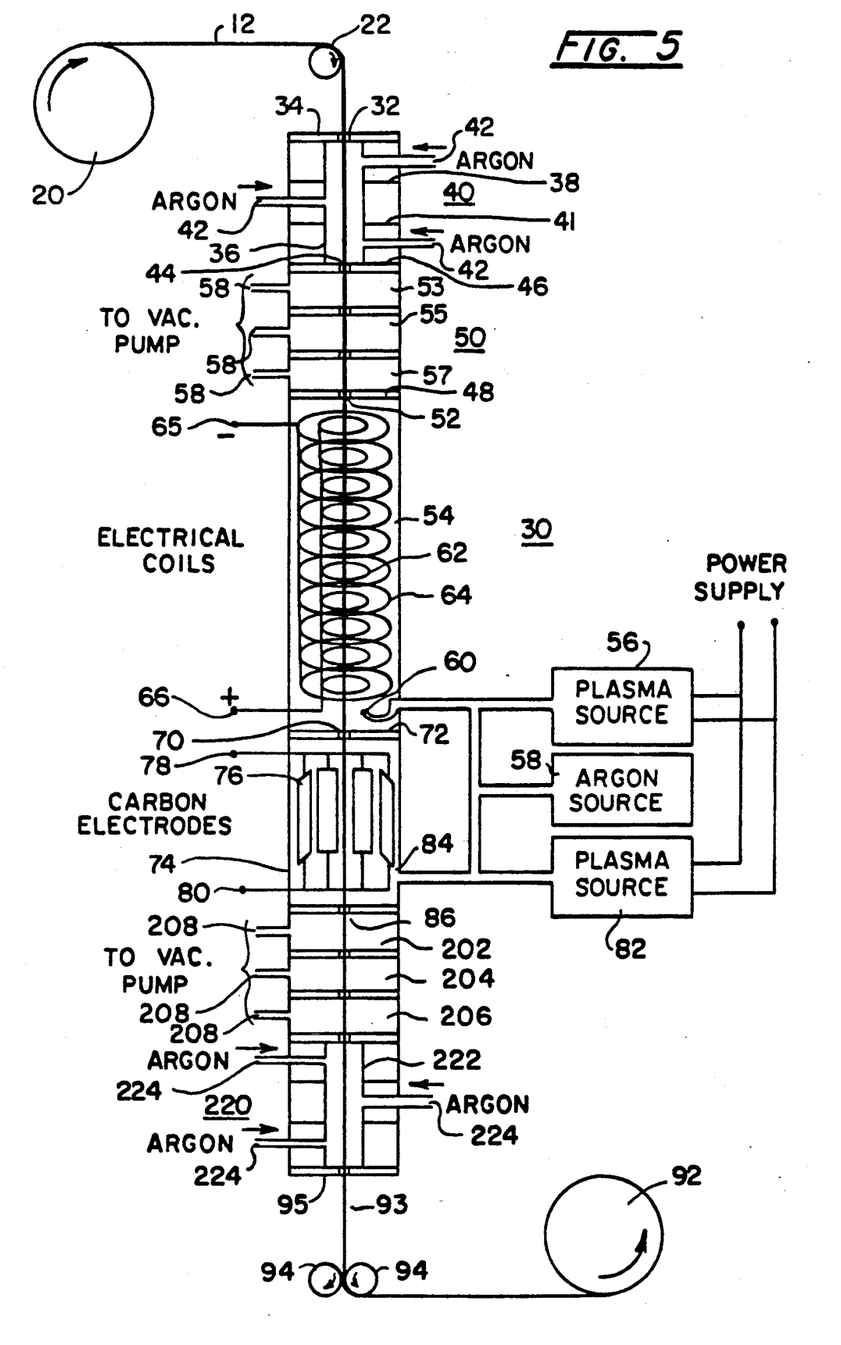
FIG. 5 is a sectional view of an apparatus for applying a continuous coating on the surface of a fiber.

In accordance with one aspect of this invention, the core fiber 12 is coated with a diamond film by depositing carbon ions onto the fiber using plasma ion deposition techniques and apparatus as are found in U.S. Pat. No. 4,402,993 and U.S. Pat. No. 4,530,750 all of which said patents are incorporated herein by reference. As shown in FIG. 5, the fiber 12 to be coated is fed from a spool 20 over roller 22 into the coating apparatus 30. The fiber 12 enters the coating apparatus 30 through an insert orifice 32 in endplate 34. Plates similar to plate 34 with a centering insert orifice 32 are used throughout the apparatus to provide various barriers and to define chambers and zones at various axial positions within the apparatus 30. The orifice 32 is of a snap-in type so that it can be readily exchanged for other orifices with differing interior bores to accommodate different diameter fibers or to give additional clearance as a result of coatings deposited on the fiber. Typically the interior surfaces of these orifices are coated with Teflon, hardened chrome, or other hardened, heat resistance friction-reducing surface materials. Generally, the orifices have a diameter that is only slightly larger than the diameter of the fiber so as to maintain centering of the fiber and at the same time allowing for the creation of air locks, vacuum chambers, and other operational environments within apparatus 30.

After entering through orifice 32, the fiber passes into airlock 40 which consists of a tube 36 which is axially centered about fiber 12 by means of plates 38 and 41. Gas inlet ports 42 are tangentially attached to tube 36 so that an inert gas such as argon may be fed through tubes 42 into tube 36 and thereby create a swirling vortex that surrounds the incoming fiber 12. This swirling inert gas vortex tends to dislodge and remove contaminants such as lint and loose material on fiber 12.

The fiber 12 then enters into vacuum chamber 50 through orifice 44 in plate 46. The vacuum chamber 50 is composed of several stages, 53, 55 and 57, each of increasing vacuum. Each stage of the vacuum section is evacuated by connection 58 to a vacuum pump (not shown). A sufficient number of vacuum stages is provided to result in a vacuum in the final stage of approximately $1 \times 10^{-6}$ atmospheres.

After passing through the vacuum section 50, the fiber 12 enters chamber 54 through orifice 52 in plate 48. Chamber 54 is essentially a plasma milling chamber in which a plasma of ions from plasma source 56 activates argon ions from an argon source 58 which are injected into the milling chamber 54 through nozzle 60. Coils 62 and 64 create an axially extending magnetic field which forces the plasma to move upwards in a direction opposite to the downward movement of fiber 12. The vigorous attack of the ions and electrons within the plasma moving through coils 62 and 64 creates a milling action on the outer cylindrical surface of fiber 12 thereby producing a more perfectly cylindrical outer surface on fiber 12 polishing out minor surface imperfections including microscopic cracks, hills and valleys. The electrical coils 62 and 64 are energized by a negative voltage at lead 65 and a positive voltage at lead 66.

After milling is complete in zone 54, fiber 12 moves through orifice 70 in plate 72 into the diamond-coating chamber 74. In chamber 74, carbon electrodes 76 are heated through leads 78 and 80 to glowing so as to emit ions. The electrodes 76 are spaced uniformly about and against the downwardly moving surface of fiber 12. The emitted or sputtered carbon ions bombard, hit and attach to the downwardly moving fiber 12 to provide a diamond-like carbon coating on fiber 12. In addition, a plasma from plasma source 82 is mixed with argon from argon source 58 and enters coating chamber 74 through nozzle 84. The plasma contains elemental carbon which further enhances the deposition of the diamond-like coating on the surface of fiber 12. A suitable hydrocarbon gas, such as methane, is used for creating elemental carbon propelled in plasma ion form against the surface of the downwardly moving fiber 12. The argon from argon source 58 may be used to fortify the plasma forming operation and as an auxiliary carrier to introduce deposition coating material into the plasma at a greater rate.

In chamber 74, it is possible to provide carbon atoms in a substantially vapor or gaseous form or as a component of gaseous additive hydrocarbon material for subsequent decomposition into the appropriate ion by means of the plasma energy from the appropriate plasma source 82. Such action is referred to as plasma pyrolysis. Use of a hydrocarbon gas aids in the desired deposition of a special type of carbon crystal film on the downwardly moving fiber 12 since the ions of the plasma thereby being formed are directed against the moving fiber 12 are carbon ions and hydrogen ions. The hydrogen ions colliding or bombarding the downwardly moving fiber or filament 12 assist in removing residual oxygen ions that may possibly remain on the outer periphery of downwardly moving fiber 12. Typically the deposition of carbon ions onto the downwardly moving fiber 12 in vacuum zone 74 provides a rate of thickness of about 10-20 angstroms per second.

The diamond-coated fiber 12 then passes through orifice 86 and into a vacuum chamber 200 similar to vacuum chamber 50 and consisting of vacuum stages 202, 204, and 205 and connections 208 to a vacuum pump (not shown). Fiber 12 then proceeds into airlock 220 similar to airlock 40 and consisting of a tube 222 and inert gas inlet ports 224. The coated fiber 12 is withdrawn from the apparatus through orifice 93 in end plate 95 over roller 94 and onto spool 92.

Although the formation of a diamond film 14 on fiber 12 has been illustrated, it is within the scope of this invention to coat the fiber with other materials such as ceramics, preferably silicon carbide or silicon nitride, or metals (including metal alloys) such as nickel, chromium or titanium and their alloys. A variety of techniques are known for coating fibers with ceramic materials and metals of which some illustrative examples are described in U.S. Pat. No. 4,530,750, U.S. Pat. No. 4,402,993 and D. Clark, N. J. Wadsworth, and W. Watt; "The Surface Treatment of Carbon Fibers for Increasing the Interlaminar Shear Strength of CFRP" in Carbon Fibers; Place Mod. Technol., London, 1974, p. 44-51.

When the fiber to be coated with a diamond-like film is sensitive to the higher temperatures of the plasma deposition process described above, it is preferable to use the low temperature ion beam technique in which the film is deposited on the fiber using low-energy ion beams followed by exposure of the film to a higher energy ion beam which increases the mobility of the condensing atoms and serves to remove lesser bound atoms. Such a process is more fully described in U.S. Pat. No. 4,490,229 to Mirtich et al., all of which said patent is herein incorporated by reference.

As noted previously, the preferable coating material will depend in many instances on the selected use of the coated and whiskered fiber. Also as noted, it is possible to omit the coating material completely and use only the whiskered fiber. In such cases, the coating process as depicted in FIG. 5, or as otherwise practiced, may be omitted. However, in any event it is often desirable to clean the fiber 16 prior to forming a whisker thereon in order to achieve a stronger bond between the fiber 12 and whisker 16 or between the fiber 12 and coating 14. In such instances, it is preferable to use a cleaning process such as the plasma milling process illustrated in FIG. 5 and described above.

It is also to be understood that a diamond, ceramic, or metal coating may be applied after a fiber has been whiskered. In such instances, the coating process described above and depicted in FIG. 5 would follow the whiskering process described below rather than proceed it. For the purposes of this invention, a coated and whiskered fiber is considered to the equivalent to a whiskered and coated fiber and it is to be understood that one form may be substituted for the other form without departing from the scope of this invention.

For the sake of clarity, the following whiskering process is described for growing whiskers on an uncoated fiber. However it is to be understood that the same process could also be used to grow whiskers 16 on a coated fiber and that the choice as to whether to apply whiskers directly to the uncoated fiber or to the coated fiber will depend on the nature of the application and the physical characteristics of the fiber 12, the whisker 16, and the coating 14.

Figure 6:
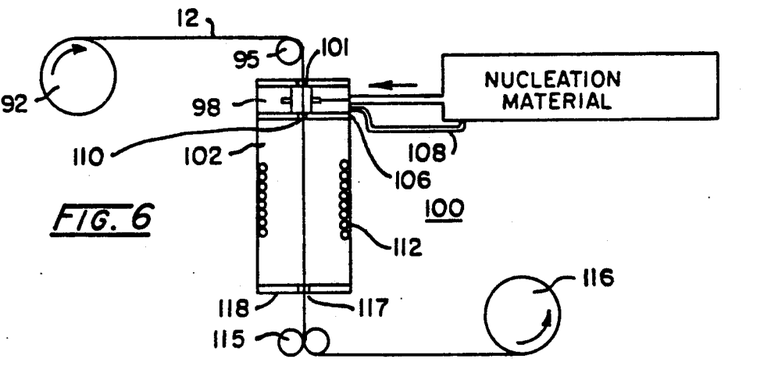
FIG. 6 is a sectional view of an apparatus for applying and drying an atomized catalyst on the surface of a fiber.

In the initial stage of the whisker forming operation illustrated in FIGS. 6, the fiber 12 is withdrawn from spool 92 over roller 94 and into nucleation site forming apparatus 100. Apparatus 100 consists essentially of two separate chambers, (1) a chamber 98 where atomized metal particles or metal compounds capable of forming metal particles are applied to fiber 12 and (2) a drying chamber 102 where the carrier for the metal particles or metal particle forming compound are removed, typically by drying.

As fiber 12 moves through orifice 101 into chamber 98, it is sprayed with a carrier containing atomized metal particles or a compound capable of forming metal particles such as transition metal compounds, e.g., iron pentacarbonyl, dicobalt octacarbonyl, and iron trichloride, and where the molten form of the resulting metal is conducive to the formation of whiskers on the fiber 12. Although a carrier, i.e., a solvent preferably is used to deposit the particles on the fiber, it is to be understood that other non-solvent techniques such as electrostatic methods may by used and are considered to be equivalent for the purposes of this invention.

For growing silicon carbide whiskers, a saturated aqueous solution of iron trichloride is sprayed (atomized) onto the fiber 12 in chamber 98 so as to produce a fine mist which is directed to all sides of the fiber 12. Excess iron trichloride solution is returned to the main iron trichloride solution supply 104 by means of outlet port 106 and return line 108. The droplets of iron trichloride are evenly distributed around the fiber 12 so as to give a predefined and controllable surface concentration that will produce nucleation sites of about 0.5 to 1.5 whiskers per 5 $\mu$m of reduced fiber length.

The diamond fiber 12 which is now coated with droplets of iron trichloride solution 104, then passes through orifice 110 into drying chamber 102 where it is dried by electrically heated coil 112 at a temperature of about 600° C. The iron trichloride atomizing, spraying and drying operations are carried out under atmospheric conditions. After drying, the fiber 12, covered with solid iron trichloride, exits chamber 104 through orifice 117 in endplate 118 over pinch rollers 115 and is wound onto spool 116 for further processing.

As noted, a variety of metal producing compounds or metals themselves may be applied to the fiber. The various compounds that are used require different application conditions that are known by those skilled in the art. For example, iron pentacarbonyl undergoes pyrophoric decomposition in the presence of oxygen and thus iron pentacarbonyl must be applied and dried in an inert atmosphere such as nitrogen. It is also to be understood that if a metal compound is used, it must be converted to the metal prior to whisker growth. Such conversion can be carried out in chamber 102. When conversion to the metal is carried out in chamber 102, it is desireable to attach the apparatus shown in FIG. 7 to the apparatus of FIG. 6 so that the fiber 12 is drawn in the whisker forming apparatus directly from the apparatus of FIG. 6 without the need for winding onto and off of spools and thereby avoiding atmospheric contact.

Figure 7:
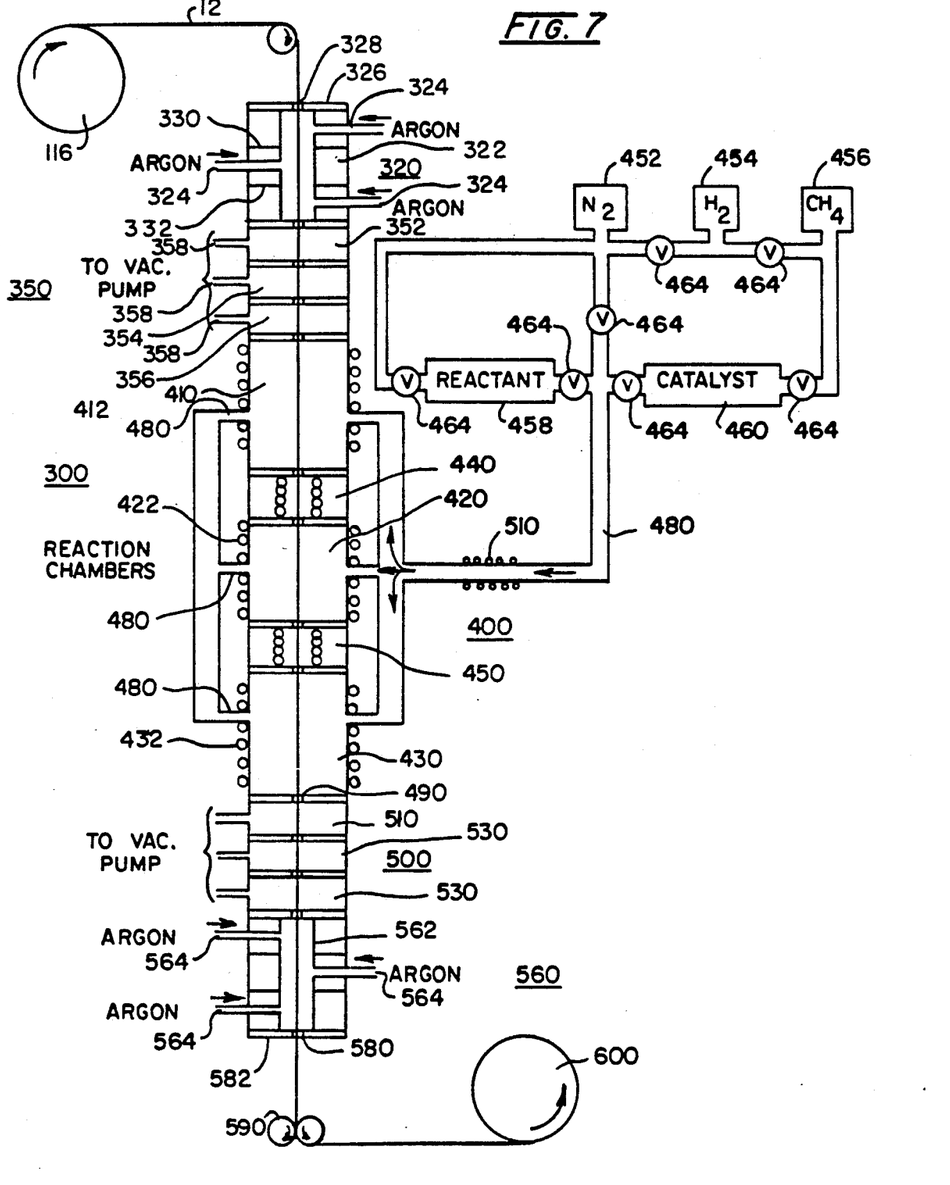
FIG. 7 is a sectional view of an apparatus for growing whiskers on a fiber.

In the whisker growing apparatus 300 illustrated in FIG. 7, fiber 12, having particles for carrying out whisker growth thereon, is fed from spool 116 through an airlock 320 and a vacuum chamber facility 350 similar to airlock 40 and vacuum chamber 50 shown in FIG. 5 and described above. Airlock 320 consists of a tube 322, gas inlet ports 324, endplate 326 with orifice 328 and centering plates 330 and 332. Vacuum chamber 350 consists of stages 352, 354, and 356 that are connected to a vacuum pump (not shown) by connections 358. The fiber 12 then enters reaction section 400 consisting of three or more reaction zones 410, 420 and 430 separated by cooling zones 440 and 450. The reaction zones are equipped with electrical heaters 412, 422 and 432 to heat the metal particles deposited on fiber 12 to the molten state and to maintain the reaction temperature of the reactants that yield the whisker forming materials. In instances where a metal compound such as iron trichloride or iron pentacarbonyl has been applied and not transformed to the metallic state, such a metal forming process is also carried out in reaction zone 410.

The gaseous whisker forming material is provided at the nucleation site, i.e., the location of the molten metal droplet on the fiber, in each of the reaction zones 410, 420 and 430. Thus for growing silicon carbide whiskers, silicon and carbon species are provided at the nucleation site; for diamond whiskers, a carbon species is provided; and for silicon nitride whiskers, silicon and nitrogen species are provided at the nucleation site. The reactant species react at the site of the molten metal droplet to form the desired whisker by a vapor-liquid-solid (VLS) mechanism. The VLS process is known in the art as exemplified by J. V. Milewski, F. D. Gac, J. J. Petrovic, and S. R. Skaggs; "Growth of the beta-silicon carbide whiskers by the VLS process" Journal of Material Science 20(1985) 1160–66.

As shown in FIG. 7, nitrogen 452, hydrogen 454, methane 456, a reactant 458, and a reaction catalyst 460 are mixed in the appropriate proportions by means of mixing and flow valves 464 and delivered to the reaction chambers 410, 420, and 430 by means of delivery tubes 480. For example, for the production of silicon carbide whiskers; nitrogen 452, hydrogen 454, methane 456, a reactant gas 458 such as silicon tetrachloride and a reaction catalyst 460 such as ferrocene are suitably mixed by using stopcock and flow control valves 464 to give a mixture of $H_2$—82.4, $N_2$—8.4 and $CH_4$—8.7 mole %. The mole ratio of $H_2$ to $SiCl_4$ is 1:4 and the average weight ratio of Fe from the ferrocene to SiC from the reaction mixture is 1:100. The average weight ratio of Si to C is 1:2.28. The mixture passes through heater 510 to increase the temperature of the reactants to approximately 500° C. to 1400° C. The reaction mixture is then fed into reaction chambers 410, 420 and 430 which are heated by heating coils 412, 422 and 432 to approximately 500° C. to 1400° C. and preferably below 1000° C., especially when the whiskers are grown on an uncoated fiber. As the reaction mixture strikes the relatively cool surface the particle deposited on fiber 12, supersaturation occurs and reaction products condense according to a vapor-liquid-solid mechanism which results in whisker growth of several microns per minute. Whisker growth is further enhanced by passing the fiber through cooling zones 440 and 450 where the relative coolness of the nucleation particle is maintained.

Growth of whiskers of various types of materials are well known and described in Canadian Patent 948 077 Maine et al, May 28, 1974 (silicon carbide whiskers); "Preparation of Diamond Whiskers" in Superhard Materials: Synthesis, Properties, and Application," Institute for Superhard Materials, Ukrainian Academy of Science, Proceedings of International Symposium, Kiev, Naukova Durka, 1983, p. 45 (diamond whiskers); and V. M. Krivoruchko, "Preparation of Refractory Compounds from the Gas Phase," Moscow, Atomizdat, 1976, p. 7 (silicon nitride whiskers). The following reaction schemes are typical of the formation of silicon carbide, diamond, and silicon nitride whiskers:

The whiskered fiber 12 exits the high temperature reaction chamber 430 through orifice 260 into the vacuum seal 500 similar to vacuum chamber 50 (FIG. 5 described above) and consisting of vacuum stages 510, 520, and 530 that are connected to a vacuum pump (not shown) by connectors 564 and inert atmosphere airlock 560 similar to airlock 40 (FIG. 5 described above) and consisting of tube 563 and inert gas inlet ports 564 after which it is withdrawn through orifice 580 in endplate 582 by pinch rollers 590 and wound onto spool 600.

Figure 8:
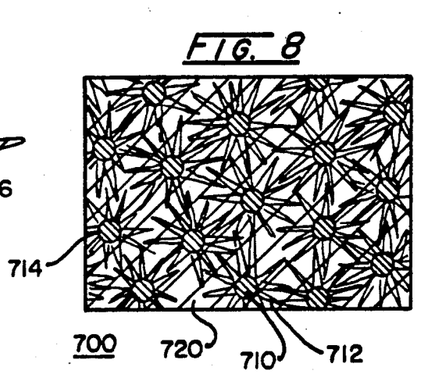
FIG. 8 is a cross-sectional view of a composite formed from coated and whiskered fibers showing the interlocking action of the whiskered fiber.

The whiskered or coated and whiskered fibers are especially useful for forming composite materials as illustrated in FIG. 8. As shown in FIG. 8, such composite materials 700 consist of whiskered or coated and whiskered fiber 710 surrounded by matrix material 720. The whiskers 712 of the fibers 710 serve several purposes. They maintain each of the fibers in a fixed position with each of the other fibers so as to provide space there between which allows for the matrix material 720 to completely engulf and cover the whiskered fiber 710. The fibers are strongly bound to the matrix due to the micromechanical interaction of the whiskers with the matrix which prevents delamination of the composite material and greatly increase the composite shear strength because of the high strength and Young's modulus of the whiskers. The whiskers 712 maintain a uniform separation of the fibers from each other thereby preventing fiber conglomeration and formation of non-impregnated groups of fibers which can cause and create local stress sights. Proper distribution of fibers in the matrix results in a decrease in thermally and mechanically induced internal stresses. Finally, when a coating 714 such as a diamond coating that is chemically inert is used, the disintegration or failure of the fibers caused by a chemical reaction between the fibers and the matrix material is avoided.

Several techniques are available for the production of composite materials reinforced with whiskered or coated and whiskered fibers. For example, the whiskered or coated and whiskered fibers can be integrated into a composite using a squeeze casting technique. The squeeze casting process typically involves shaping the whiskered or coated and whiskered fibers into a preform, that is, layers of strands of the whiskered fiber arranged parallel to each other and in the general shape of the item to be cast. Typically, the volume of the whiskered fibers occupies about 10 to 40 volume % of the item to be cast. Once the fibers have been arranged into the preform, they are placed into a die cavity. A molten matrix material 520, such as molten aluminum or magnesium alloy, is then poured into the cavity and the preform and molten metal are subjected to the pressure of a press, so as to squeeze the molten metal in and between the spaces formed by the whiskers 512 of the fibers 510.

In another technique for forming composite materials, alternate layers of the matrix material, e.g., aluminum alloy foil, and whiskered fibers are assembled. The alternate layers of the matrix material and the whiskered fibers are then heated and rolled (pressure shaped) so as to form a composite sheet or article. The whiskered fibers can be arranged in patterns in which the fibers are not all parallel to each other, that is, in each successive layer, the whiskered fibers can be arranged so that each layer of fiber is arranged in a different direction from that of the layer of fibers immediately above or below it, i.e. in a criss-crossing fashion.

As shown in the following table, a wide variety of fiber and matrix materials can be chosen to provide a large number of composite materials for wide and differing applications.

TABLE I

Composite Materials with Reinforcing Fibers having a Silicon Carbide Coating and Silicon Carbide Whiskers.

| FIBER | MATRIX MATERIAL | FIBER VOLUME % | USE |
|---|---|---|---|
| Thornel 100 | Al Alloy Al-94%; Mn-1%; Cu-5% | 30-45 | Structural material for aircraft and automobile industry; lightweight armor |
| Thornel 100 | Ni Alloy: Ni-53.7%; Co-20.0%; Cr-10.0%; Mo-5.0%; Al-5.0%; Ti-3.7%; Mn-0.3%; Si-0.3%; Fe-1.8%; C-0.2%; B-0.02%; | 40-55 | Sheets and nozzle parts for jet engines |
| Thornel 100 | Polyimide 2080 | 45-60 | Structural material for aircraft industry; lightweight armor |
| Silicon Carbide | Al Alloy: Al-94%; Mn-1%; Cu-5% | 45-60 | Structural material for aircraft industry |
| Silicon Carbide | Ni Alloy: Ni-53.7% Co-20.0%; Cr-10.0% Mo-5.0%; Al-5.0%; Ti-3.7%; Mn-0.3%; Si-0.3%; Fe-1.8%; C-0.2%; B-0.02%; | 25-50 | Blades and vanes of gas turbine engines |
| Silicon Carbide | Ti Alloy: Ti-90%; Al-6%; V-4%; | 25-50 | Structural material for space industry |
| S-Glass | Al-Alloy: Al-94%; Mn-1%; Cu-5%; | 30-45 | Structural material for aircraft and automobile industry; lightweight armor |
| S-Glass | Ni-Alloy: Ni-53.7%; Co-20.0%; Cr-10.0%; Mo-5.0%; Al-5.0%; Ti-3.7%; Mn-0.3%; Si-0.3%; Fe-1.8%; C-0.2%; B-0.02%; | 45-55 | Blades and vanes of gas turbine engines |
| S-Glass | Polyamide 2080 | 45-60 | Structural material for Aircraft Industry; lightweight armor |
| W-Re Wire W-80%; Re-20% | Ni Alloy: Ni-53.7%; Co-20.0%; Cr-10.0%; Mo-5.0%; Al-5.0%; Ti-3.7%; Mn-0.3%; Si-0.3%; Fe-1.8%; C-0.2%; B-0.02%; | 25-50 | Combustion chambers and blades of gas turbine engines |

Thornel 100 (carbon fiber) is a trademark of the Union Carbide Corporation.
Polyamide 2080 is a polymer of 4,4'-carbonyl bis 1,2-benzenedicarboxylic acid, with a 4-methyl-1,3-benzenediamine and 4,4'-methylenebis [benzenamine].

It may be possible that changes in the configurations to other than those shown could be used but that which is shown is preferred and typical. Without departing from the spirit of this invention, various means of arranging and forming the various fibers and matrix materials into a fiber-reinforced composite may be used.

It is therefore understood that although the present invention has been specifically disclosed with preferred embodiments and examples, modifications to the design concerning size, shape and materials may be apparent to those skilled in the art, and such modifications and variations are considered to be within the scope of the invention and the appended claims.

What is claimed is:

1. A coated and whiskered fiber comprising:
   a) a core fiber,
   b) a continuous, uninterrupted coating deposited on said core fiber, and
   c) whiskers intimately attached to and projecting outwardly from said coating.

2. The coated and whiskered fiber according to claim 1 wherein said core fiber is a fiber selected from the group of fibers consisting of carbonaceous fibers, ceramic fibers, glass fibers and metal fibers.

3. The coated and whiskered fiber according to claim 2 wherein said carbonaceous fiber is a carbon fiber.

4. The coated and whiskered fiber according to claim 3 with said carbon fiber is made from polyacrylonitrile.

5. The coated and whiskered fiber according to claim 2 wherein said ceramic fiber is a silicon carbide fiber.

6. The coated and whiskered fiber according to claim 2 wherein said glass fiber is an S-type glass fiber.

7. The coated and whiskered fiber according to claim 2 wherein said metal fiber is a tungsten-based alloy fiber.

8. The coated and whiskered fiber according to claim 1 wherein said coating is formed from the group of coating materials consisting of metals, ceramics, and diamond materials.

9. The coated and whiskered fiber according to claim 8 wherein said metal coating material is nickel.

10. The coated and whiskered fiber according to claim 8 wherein said ceramic coating material is silicon carbide.

11. The coated and whiskered fiber according to claim 8 wherein said coating material is diamond.

12. The coated and whiskered fiber according to claim 1 wherein the material from which said whiskers are formed is diamond or a ceramic material.

13. The coated and whiskered fiber according to claim 12 wherein said whisker ceramic material is selected from the group of ceramic materials consisting of silicon nitride, silicon carbide, titanium carbide and titanium oxide.

14. The coated and whiskered fiber according to claim 13 wherein said whisker ceramic material is silicon carbide.

15. The coated and whiskered fiber according to claim 12 wherein said whisker material is diamond.

16. The coated and whiskered fiber according to claim 15 wherein said coating is a diamond coating.

17. The coated and whiskered fiber according to claim 16 wherein said core fiber is a carbon fiber.

18. A composite material reinforced with coated and whiskered fibers comprising:
 a) the diamond coated and diamond whiskered material of claim 16, and
 b) a matrix material.

19. A composite material reinforced with coated and whiskered fibers comprising:
 a) fibers having a continuous, uninterrupted coating that completely covers and surrounds each fiber;
 b) whiskers intimately attached to and projecting outwardly from said coating; and
 c) a matrix material.

20. The composite material reinforced with coated and whiskered fibers according to claim 19 wherein said matrix material is selected from the group of matrix materials consisting of glasses, metals, polymeric materials, and ceramic materials.

21. The composite material reinforced with coated and whiskered fibers according to claim 20 wherein said matrix material is an aluminum or magnesium alloy.

22. The composite material reinforced with coated and whiskered fibers according to claim 20 wherein said polymer is a polymer of 4,4'-carbonylbis 1,2-benzenedicarboxylic acid with 4-methyl-1,3- benzenediamine and 4,4'-methylenebis[benzenamine].

23. The composite material reinforced with coated and whiskered fibers according to claim 19 wherein said fibers are selected from the group of fibers consisting of carbonaceous fibers, ceramic fibers, glass fibers, and metal fibers.

24. The composite material reinforced with coated and whiskered fibers according to claim 19 wherein said whiskers are ceramic whiskers or diamond whiskers.

25. The composite material reinforced with coated and whiskered fibers according to claim 19 wherein said coating is selected from the group of coatings consisting of metals, ceramics and diamond.

* * * * *